(12) United States Patent
Chae et al.

(10) Patent No.: US 11,588,589 B2
(45) Date of Patent: Feb. 21, 2023

(54) METHOD FOR PERFORMING SIDELINK COMMUNICATION ON BASIS OF POLAR CODE AND DEVICE THEREFOR

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/043,627

(22) PCT Filed: Mar. 29, 2019

(86) PCT No.: PCT/KR2019/003696
§ 371 (c)(1),
(2) Date: Sep. 29, 2020

(87) PCT Pub. No.: WO2019/190258
PCT Pub. Date: Oct. 3, 2019

(65) Prior Publication Data
US 2021/0021387 A1    Jan. 21, 2021

(30) Foreign Application Priority Data

Mar. 30, 2018    (KR) .................... 10-2018-000036929

(51) Int. Cl.
*H04L 1/18*   (2006.01)
*H04L 1/1867*   (2023.01)
(Continued)

(52) U.S. Cl.
CPC ............ *H04L 1/1893* (2013.01); *H04L 1/003* (2013.01); *H04L 1/0009* (2013.01); *H04L 1/08* (2013.01);
(Continued)

(58) Field of Classification Search
CPC ... H04L 1/1867; H04L 1/1893; H04L 1/0028; H04L 1/003; H04L 1/0075; H04L 1/18;
(Continued)

(56) References Cited

U.S. PATENT DOCUMENTS

2014/0304574 A1* 10/2014 Seo ..................... G06F 11/1004
                                                        714/807
2017/0245292 A1*  8/2017 Agiwal ................. H04W 28/02
(Continued)

FOREIGN PATENT DOCUMENTS

CN        107800510          3/2018
EP           3820062    * 12/2020  ............... H04L 1/06
(Continued)

OTHER PUBLICATIONS

European Patent Office Application Serial No. 19777951.5, Search Report dated Apr. 30, 2021, 10 pages.
(Continued)

*Primary Examiner* — Warner Wong
(74) *Attorney, Agent, or Firm* — Lee, Hong, Degerman, Kang & Waimey PC

(57) ABSTRACT

Disclosed are a method for transmitting a sidelink signal encoded on the basis of a polar code, by a terminal in a wireless communication system supporting a sidelink according to various embodiments, and a device therefor. Disclosed are a method for transmitting a sidelink signal encoded on the basis of a polar code and a device therefor, the method comprising the steps of: mapping, to bit indices of a polar code, information bits of input information including information on a plurality of fields; encoding the mapped information bits on the basis of the polar code; and transmitting a sidelink signal including the encoded information bits, wherein information bits corresponding to a particular field among the plurality of fields are mapped to
(Continued)

a bit index lower than a bit index to which the information bits corresponding to the remaining fields are mapped.

12 Claims, 18 Drawing Sheets

(51) Int. Cl.

| | | |
|---|---|---|
| *H04L 1/00* | (2006.01) | |
| *H04L 1/08* | (2006.01) | |
| *H04L 1/1812* | (2023.01) | |
| *H04L 5/00* | (2006.01) | |
| *H04W 56/00* | (2009.01) | |
| *H04W 72/00* | (2023.01) | |
| *H04L 67/147* | (2022.01) | |

(52) U.S. Cl.
CPC .......... *H04L 1/1812* (2013.01); *H04L 5/0048* (2013.01); *H04W 56/001* (2013.01); *H04W 72/005* (2013.01); *H04L 67/147* (2013.01)

(58) Field of Classification Search
CPC ..... H04L 1/1812; H04L 1/001; H04L 1/0001; H04L 1/0009; H04L 5/00; H04L 5/0048; H04L 5/0051; H04L 1/08; H04L 1/189; H04L 65/1069; H04L 12/1818; H04L 67/147; H04W 72/00; H04W 72/005; H04W 56/00; H04W 56/001
See application file for complete search history.

(56) References Cited

U.S. PATENT DOCUMENTS

| | | | | |
|---|---|---|---|---|
| 2017/0353269 | A1* | 12/2017 | Lin | H04L 1/0064 |
| 2018/0019766 | A1 | 1/2018 | Yang et al. | |
| 2018/0054237 | A1* | 2/2018 | Tseng | H04W 36/0033 |
| 2019/0082435 | A1* | 3/2019 | Noh | H04B 7/0417 |
| 2019/0379486 | A1* | 12/2019 | Hwang | H04L 1/0057 |
| 2020/0008030 | A1* | 1/2020 | Kim | H04L 5/003 |
| 2020/0008176 | A1* | 1/2020 | Shukair | H04W 52/367 |
| 2020/0059944 | A1* | 2/2020 | Lee | H04W 72/14 |
| 2020/0091936 | A1* | 3/2020 | Wang | H04L 1/0041 |
| 2020/0092857 | A1* | 3/2020 | Chen | H03M 13/356 |
| 2020/0100119 | A1* | 3/2020 | Byun | H04W 16/28 |
| 2020/0169352 | A1* | 5/2020 | Zhou | H03M 13/13 |
| 2020/0228238 | A1* | 7/2020 | Zhou | H04L 1/0043 |
| 2020/0358555 | A1* | 11/2020 | Chen | H04L 1/0061 |
| 2020/0366404 | A1* | 11/2020 | Jang | H03M 13/13 |
| 2020/0403728 | A1* | 12/2020 | Chen | H04L 1/0057 |
| 2021/0075485 | A1* | 3/2021 | Chen | H04B 7/0636 |
| 2021/0075538 | A1* | 3/2021 | Noh | H04L 1/0033 |
| 2021/0144704 | A1* | 5/2021 | Kim | H04L 27/2602 |
| 2021/0185559 | A1* | 6/2021 | Lee | H04L 47/2458 |

FOREIGN PATENT DOCUMENTS

| | | | | |
|---|---|---|---|---|
| WO | 2017157027 | | 9/2017 | |
| WO | 2017176309 | | 10/2017 | |
| WO | 201721 0205 | | 12/2017 | |
| WO | WO-2019154274 A1 * | 8/2019 | | H04L 5/003 |

OTHER PUBLICATIONS

Adrat et al., "Proceedings of WinnComm Europe 2017 Wireless Innovation European Conference on Wireless Communications Technologies and Software Defined Radio," May 2017, 68 pages.
PCT International Application No. PCT/KR2019/003696, International Search Report dated Jul. 4, 2019, 19 pages.
MediaTek Inc., "Design of Order and Mapping of PBCH Fields," 3GPP TSG RAN WG1 RAN1 Meeting #91, R1-1719576, Dec. 2017, 11 pages.
CMCC, "Discussion on DCI format design," 3GPP TSG RAN WG1 Meeting #92, R1-1802042, Mar. 2018, 9 pages.
LG Electronics, "Text proprosals on TS 38.212 for LI reporting," 3GPP TSG RAN WG1 RAN1 Meeting AH 1801, R1-1800361, Jan. 2018, 8 pages.
Intel Corporation, "Short TTI Design Options for LTE V2V Sidelink Communication," 3GPP TSG RAN WG1 Meeting #90, R1-1712487, Aug. 2017, 10 pages.
European Patent Office Application Serial No. 19777951.5, Office Action dated Jan. 28, 2022, 7 pages.
Intel Corporation, "Scheduling Assignment for Sidelink V2V Communication", R1-164141, 3GPP TSG RAN WG1 Meeting #85, May 2016, 8 pages.
The State Intellectual Property Office of the People's Republic of China Application Serial No. 201980023461.1, Office Action dated Nov. 16, 2022, 7 pages.

* cited by examiner

FIG. 5
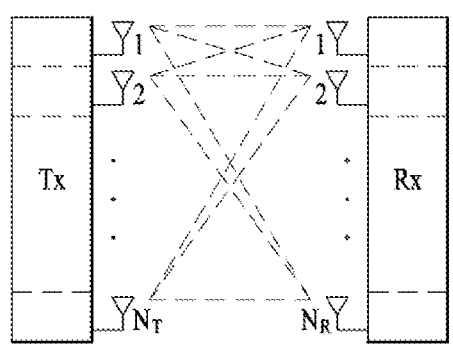
(a)
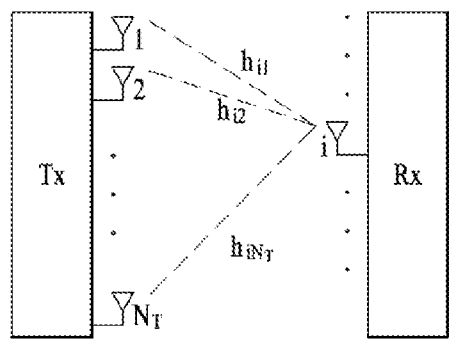
(b)

FIG. 8
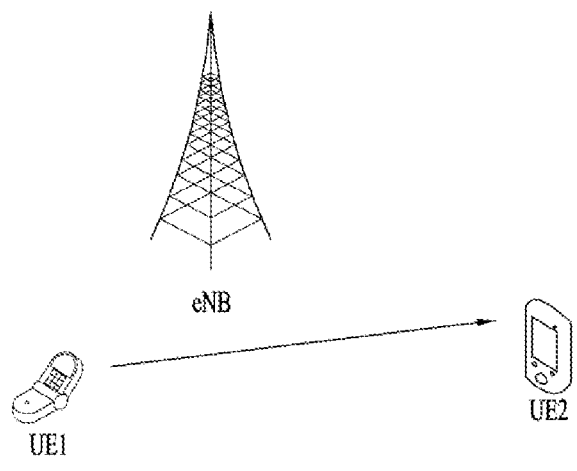
(a)
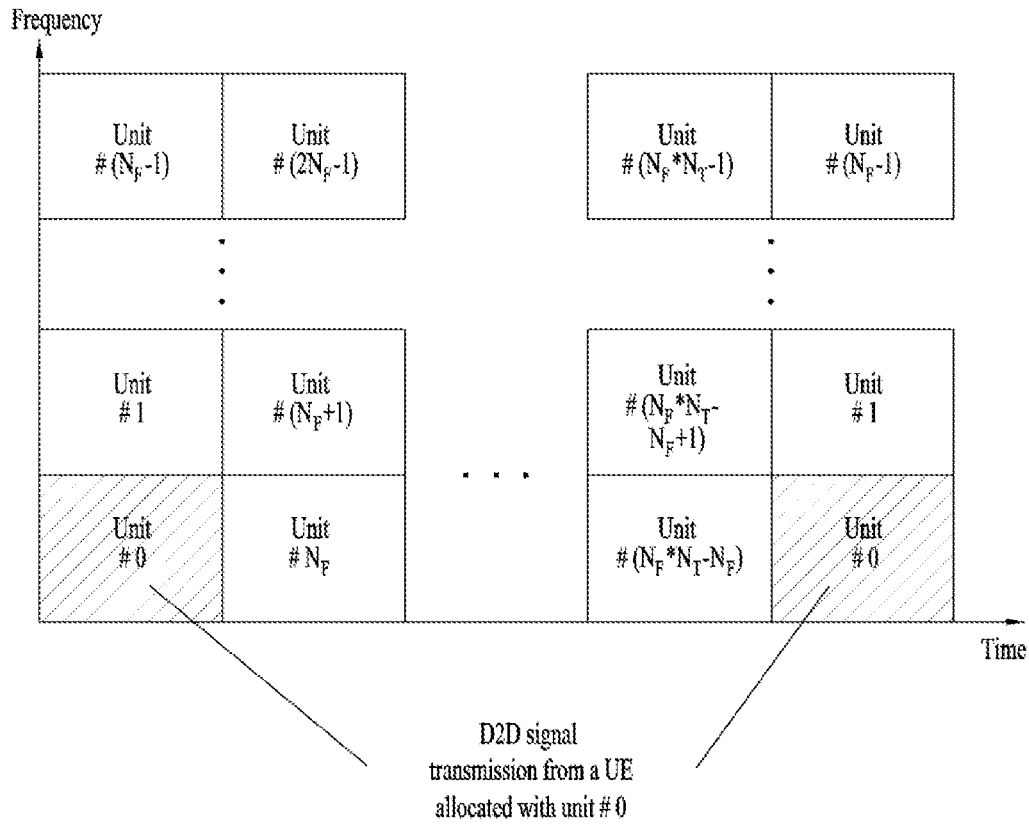
(b)

FIG. 9
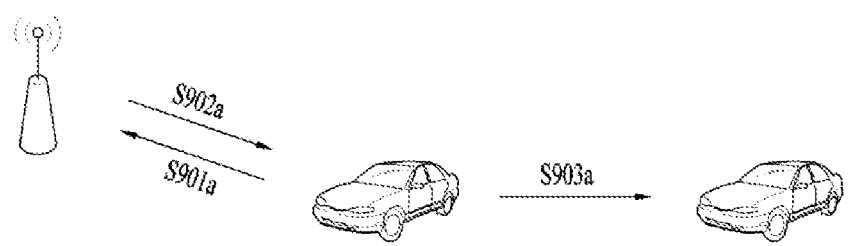
(a)
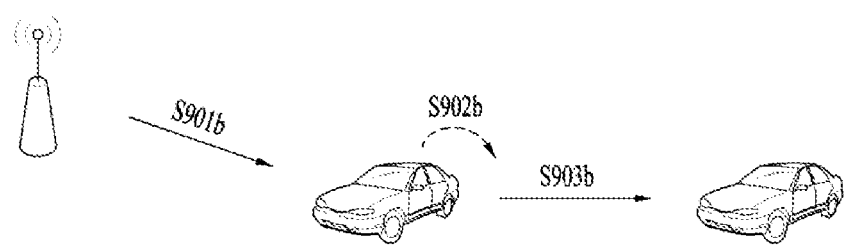
(b)

FIG. 14
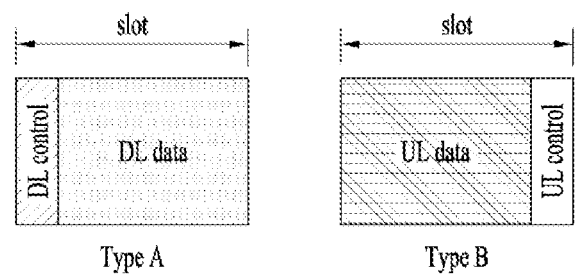
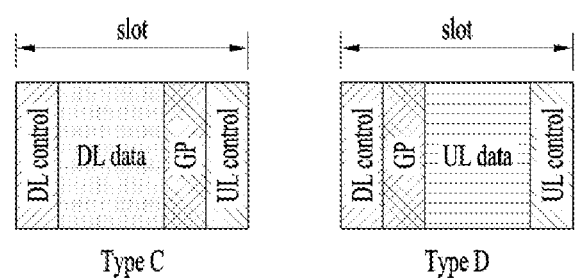

ional Application No. PCT/KR2019/# METHOD FOR PERFORMING SIDELINK COMMUNICATION ON BASIS OF POLAR CODE AND DEVICE THEREFOR

CROSS-REFERENCE TO RELATED APPLICATION

This application is the National Stage filing under 35 U.S.C. 371 of International Application No. PCT/KR2019/003696, filed on Mar. 29, 2019, which claims the benefit of earlier filing date and right of priority to Korean Application No. 10-2018-0036929, filed on Mar. 30, 2018, the contents of which are all incorporated by reference herein in their entirety.

TECHNICAL FIELD

The present disclosure relates to a method of performing sidelink communication in a wireless communication system and device therefor and, more particularly, to a method of transmitting and receiving a sidelink signal encoded based on a polar code and device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

According to the present disclosure, a specific field among a plurality of fields included in a sidelink signal is mapped to bit indices such that the specific field is decoded first, thereby minimizing unnecessary decoding of the remaining fields.

According to the present disclosure, information bits related to a sidelink signal and frozen bits with predetermined bit values are encoded based on a polar code, and the frozen bits are allocated first to a specific orthogonal frequency-division multiplexing (OFDM) symbol among a plurality of OFDM symbols included in a time unit for transmitting the sidelink signal, thereby preventing the information bits from being allocated to OFDM symbol(s) which are not suitable for decoding.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of transmitting, by a user equipment (UE), a sidelink signal encoded based on a polar code in a wireless communication system supporting sidelink. The method may include mapping information bits of input information including information about a plurality of fields to bit indices of the polar code, encoding the mapped information bits based on the polar code, and transmitting the sidelink signal including the encoded information bits. In this case, information bits corresponding to a specific field among the plurality of fields may be mapped to bit indices lower than bit indices to which information bits corresponding to the remaining fields are mapped.

Additionally, the specific field may be a field indicating a resource region for transmitting a sidelink data signal or a field about whether retransmission is performed.

Additionally, the specific field may be a basis for determining whether the remaining fields are decoded.

Additionally, the specific field may be a field indicating a transmission type of a control signal or a field for a sidelink transmission mode.

Additionally, the specific field may be a basis for determining a sidelink signal to be decoded first among sidelink signals.

Additionally, the specific field may be a field related to proximity service (ProSe) per-packet priority (PPPP).

Additionally, the specific field may be a field related to a hybrid automatic repeat request (HARQ) acknowledgement (ACK).

Additionally, the specific field may be a field for a sidelink transmission mode.

Additionally, when the sidelink signal is a physical sidelink broadcast channel (PSBCH) signal, the specific field may be a field related to information about a reference synchronization signal.

Alternatively, the method may include mapping the information bits of the input information and frozen bits with predetermined bit values to bit indices of the polar code, encoding the mapped information and frozen bits based on the polar code, and transmitting the sidelink signal including the encoded information and frozen bits. In this case, the encoded frozen bits may be allocated first to a specific orthogonal frequency-division multiplexing (OFDM) symbol among a plurality of OFDM symbols included in a time unit for transmitting the sidelink signal.

Additionally, the specific OFDM symbol may be an OFDM symbol used for automatic gain control (AGC) tuning.

Additionally, the symbol used for the AGC tuning may be the first OFDM symbol among the plurality of OFDM symbols.

Additionally, the specific OFDM symbol may be a guard symbol for switching between transmission and reception modes.

Additionally, the guard symbol may be the last OFDM symbol among the plurality of OFDM symbols.

Advantageous Effects

According to the present disclosure, a specific field among a plurality of fields included in a sidelink signal is mapped to bit indices such that the specific field is decoded first, thereby minimizing unnecessary decoding of the remaining fields.

According to the present disclosure, information bits related to a sidelink signal and frozen bits with predetermined bit values are encoded based on a polar code, and the frozen bits are allocated first to a specific orthogonal frequency-division multiplexing (OFDM) symbol among a plurality of OFDM symbols included in a time unit for transmitting the sidelink signal, thereby preventing the information bits from being allocated to OFDM symbol(s) which are not suitable for decoding.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings:

FIG. 5 is a view illustrating the configuration of a wireless communication system having multiple antennas;

FIG. 8 is a view illustrating an exemplary D2D resource pool for D2D communication;

FIG. 9 is a view referred to for describing transmission modes and scheduling schemes for vehicle-to-everything (V2X);

FIGS. 13 and 14 are views illustrating a new radio access technology (NRAT) frame structure;

BEST MODE

Figure 1:
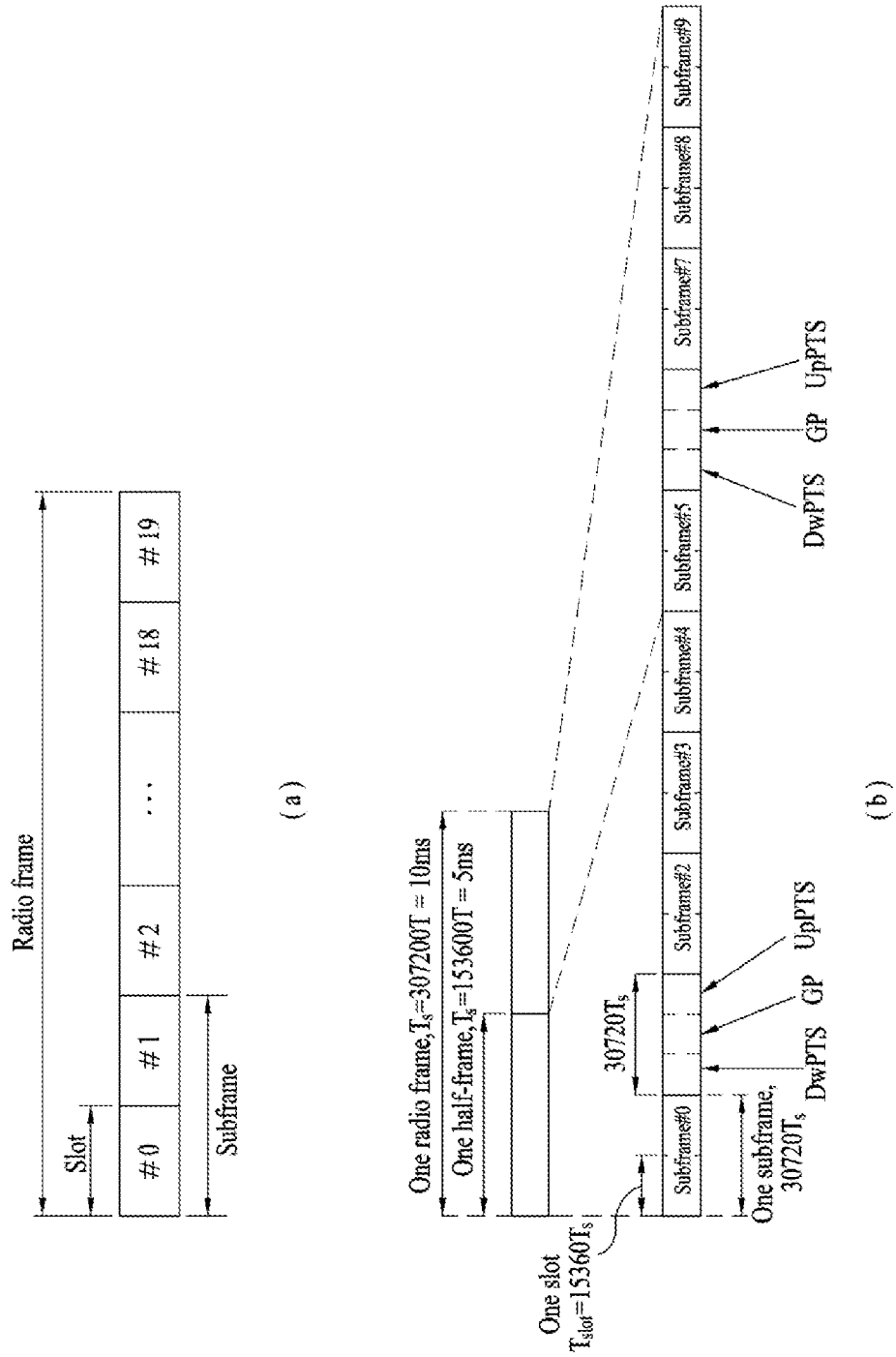
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. The order of the operations described in the embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency-division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
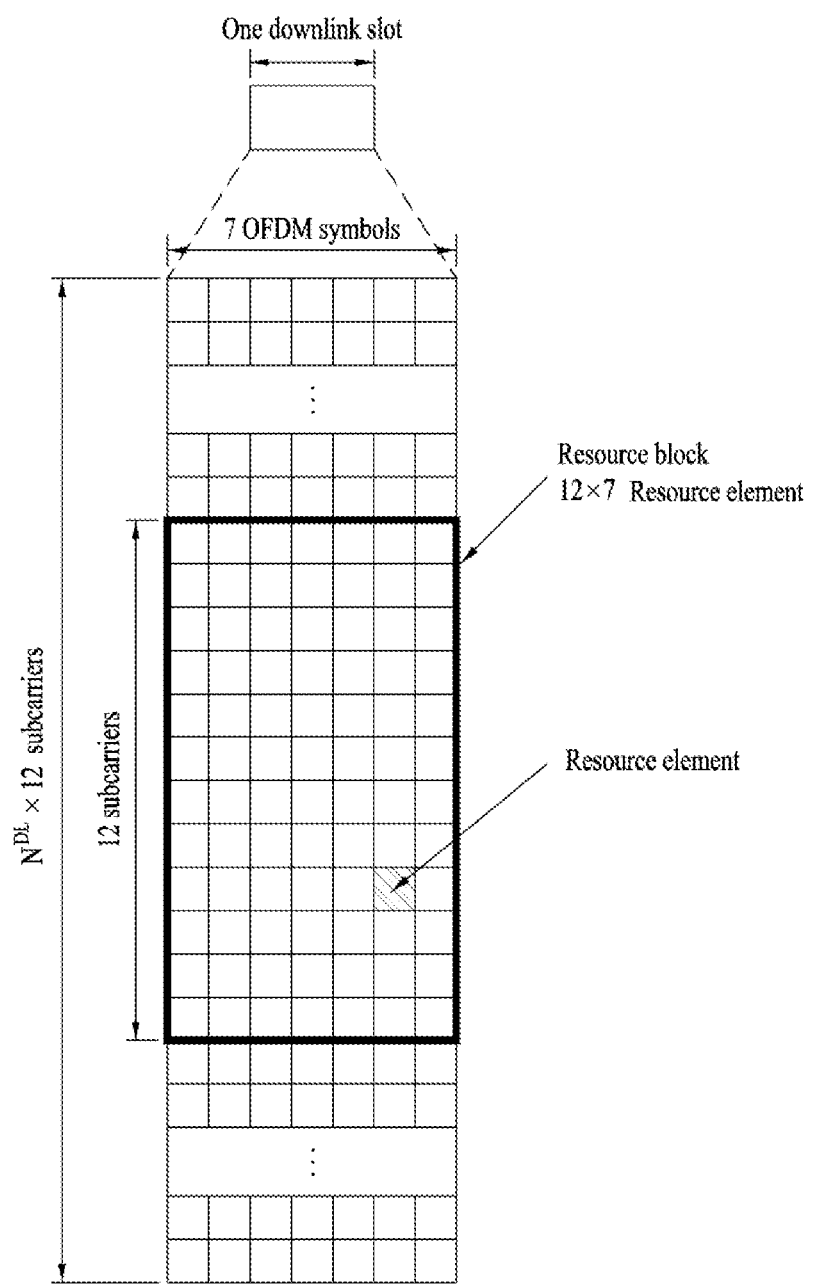
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
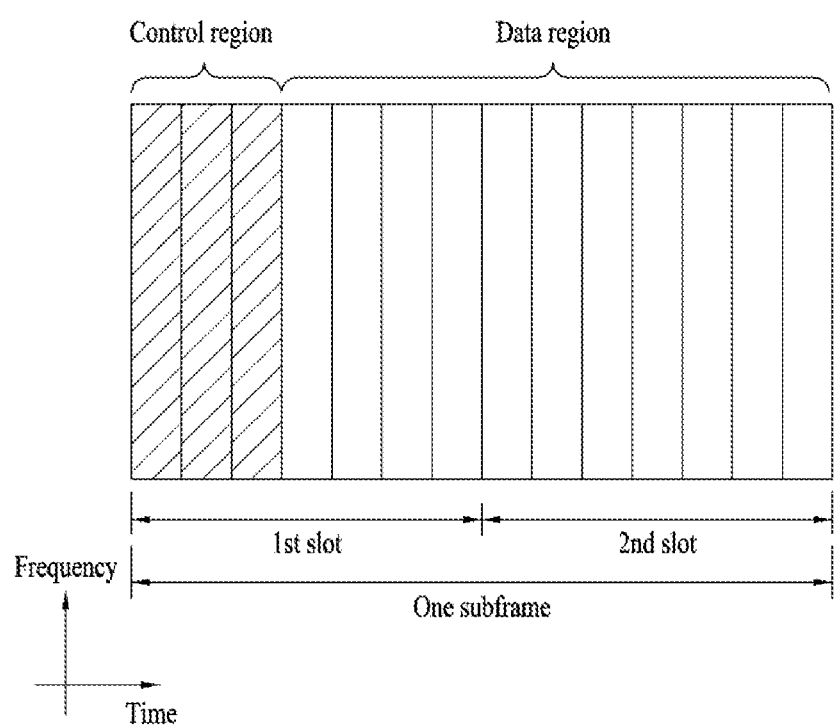
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL- SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
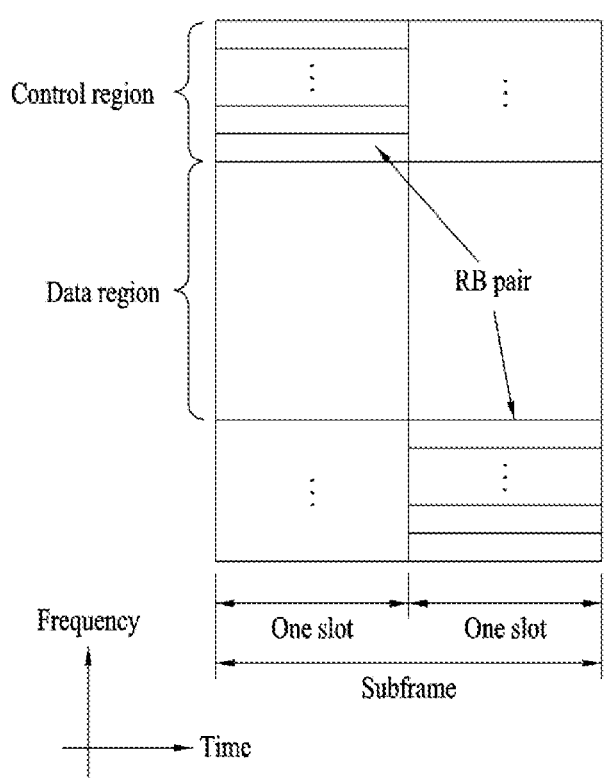
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:
 i) Demodulation-reference signal (DM-RS) used for channel estimation for coherent demodulation of information delivered on a PUSCH and a PUCCH; and
 ii) Sounding reference signal (SRS) used for an eNB or a network to measure the quality of an uplink channel in a different frequency.

The downlink RSs are categorized into:
 i) Cell-specific reference signal (CRS) shared among all UEs of a cell;
 ii) UE-specific RS dedicated to a specific UE;
 iii) DM-RS used for coherent demodulation of a PDSCH, when the PDSCH is transmitted;
 iv) Channel state information-reference signal (CSI-RS) carrying CSI, when downlink DM-RSs are transmitted;
 v) Multimedia broadcast single frequency network (MBSFN) RS used for coherent demodulation of a signal transmitted in MBSFN mode; and
 vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of Multiple-Input Multiple-Output (MIMO) System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s=[s_1,s_2,\ldots,s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$s\hat{s}=[\hat{s}_1,\hat{s}_2,\ldots,\hat{s}_{N_T}]^T=[P_1s_1,P_2s_2,\ldots,P_{N_T}s_{N_T}]^T \qquad \text{[Equation 3]}$$

In addition, ŝ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring $N_T$ transmitted signals $x_1, x_2, \ldots, x_{N_T}$, which are actually transmitted, by applying weight matrix W to the information vector Ŝ having the adjusted transmit powers, the weight matrix W serves to appropriately distribute the transmission information to each antenna according to a transport channel state. $X_1, X_2, \ldots, X_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y=[y_1,y_2,\ldots,y_{N_R}]^T \qquad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix.

In FIG. 5(b), the channels from the NT Tx antennas to the Rx antenna i can be expressed as follows.

$$h_i^T=[h_{i1},h_{i2},\ldots,h_{iN_T}] \qquad \text{[Equation 7]}$$

Accordingly, all channels from the NT Tx antennas to the NR Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \qquad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n=[n_1,n_2,\ldots,n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx+n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number NT of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank (H) of the channel matrix H is restricted as follows.

$$\text{rank}(H) \leq \min(N_T,N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
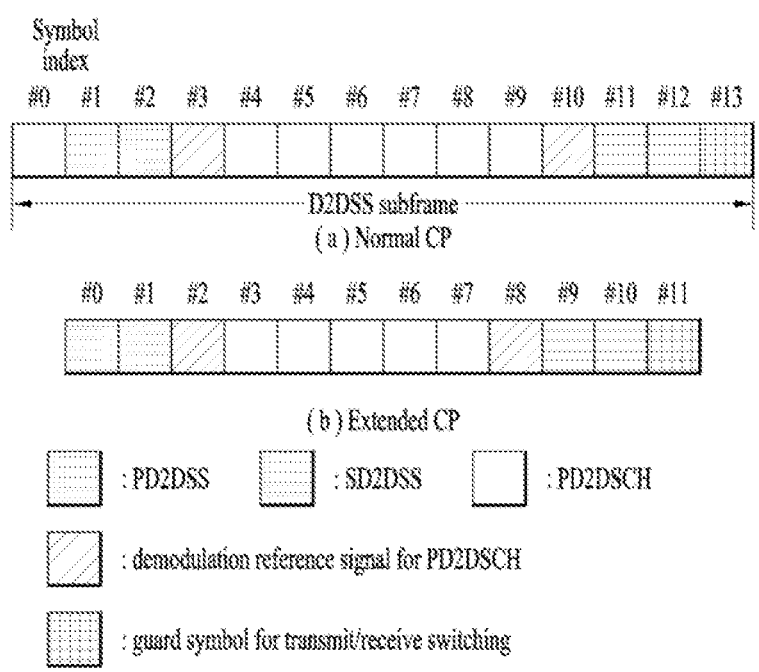
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a downlink (DL) primary synchronization signal (PSS), the PD2DSS may use a different Zadoff-Chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike the DL PSS/SSS (secondary synchronization signal), the PD2DSS/SD2DSS follows an uplink (UL) subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
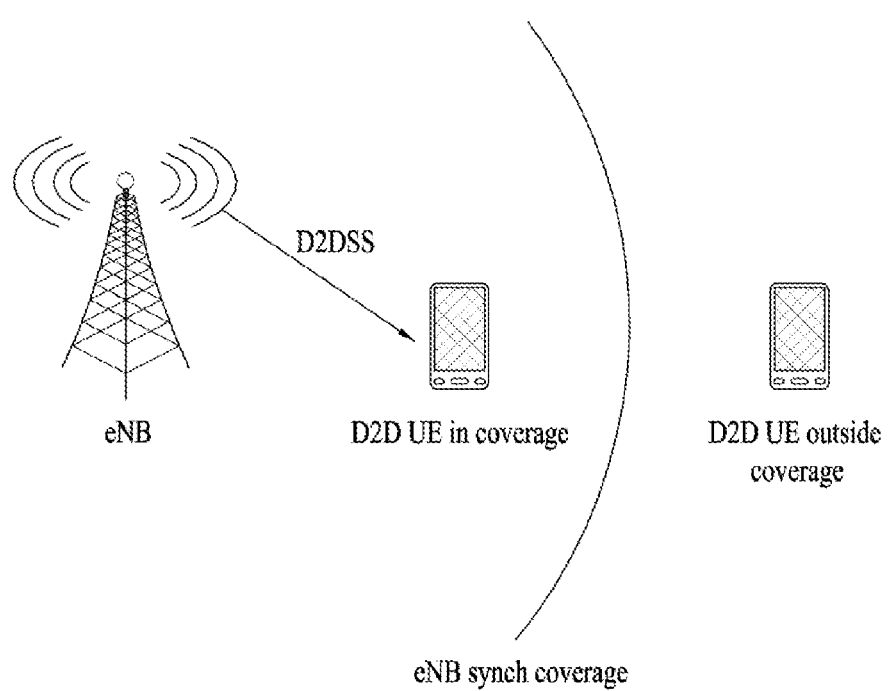
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the NF number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 10:
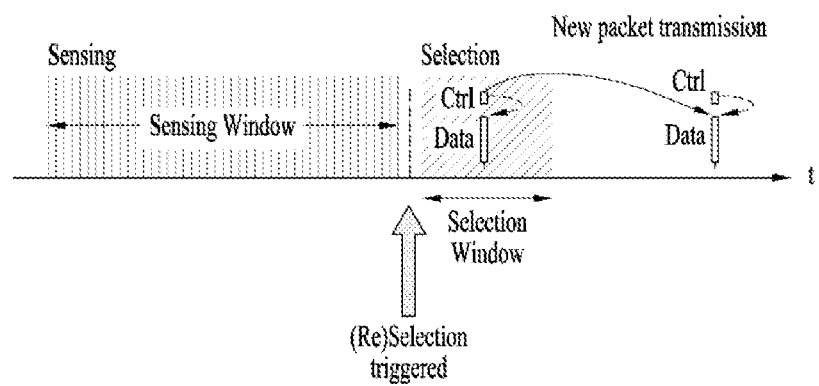
FIG. 10 is a view illustrating a method of selecting resources in V2X.
Figure 11:
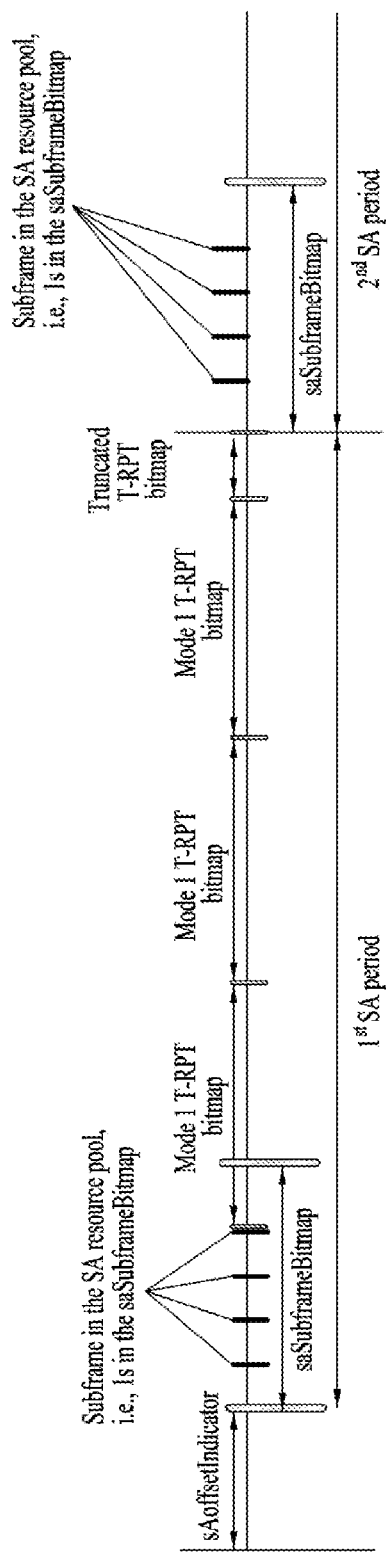
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901a), the eNB allocates the resources (S902a), and the vehicle transmits a signal in the resources to another vehicle (S903a). In the centralized transmission scheme, resources of another carrier may be also scheduled. In distributed scheduling corresponding to transmission mode 4 illustrated in FIG. 9(b), a vehicle selects transmission resources (S902b), while sensing resources preconfigured by the eNB, that is, a resource pool (S901b), and then transmits a signal in the selected resources to another vehicle (S903b). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Figure 12:
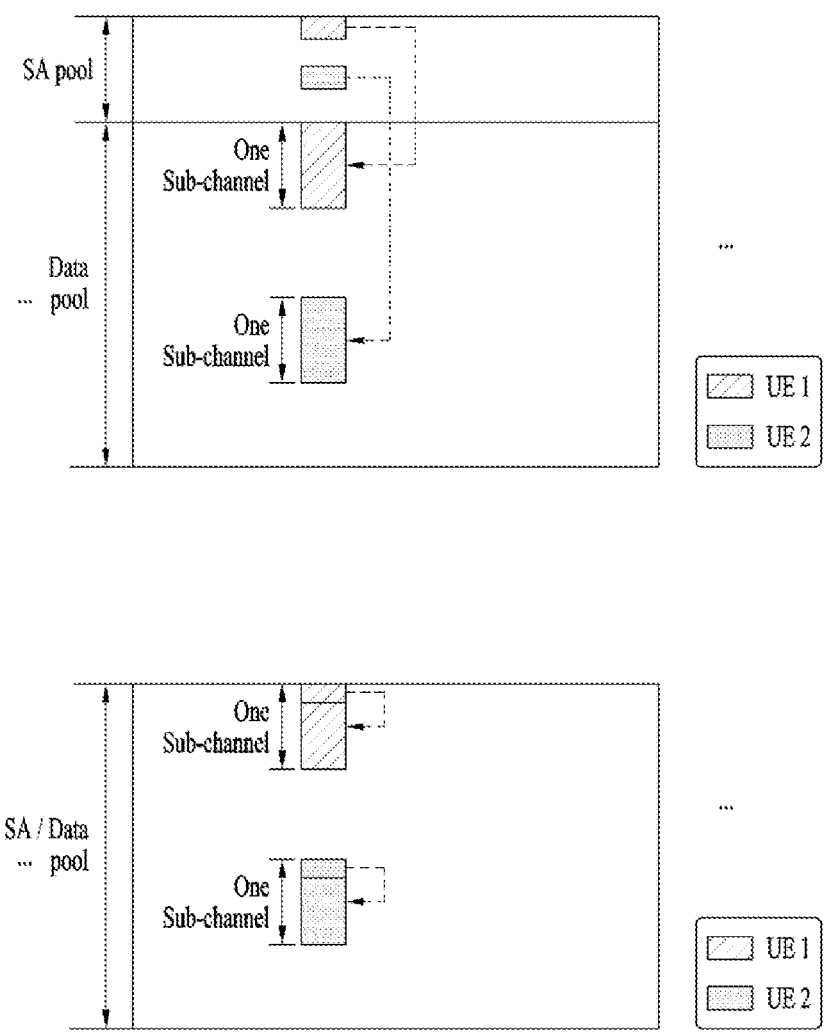
FIG. 12 is a view referred to for describing an SA and data transmission in V2X.

Unlike D2D, an SA (PSCCH) and data (PSSCH) are frequency-division multiplexed (FDM) and transmitted in V2X, that is, sidelink transmission mode 3 or 4. Because latency reduction is a significant factor in V2X in view of the nature of vehicle communication, an SA and data are FDM and transmitted on different frequency resources of the same time resources. Examples of this transmission scheme are illustrated in FIG. 12. An SA and data may not be contiguous to each other as illustrated in FIG. 12(a) or may be contiguous to each other as illustrated in FIG. 12(b). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
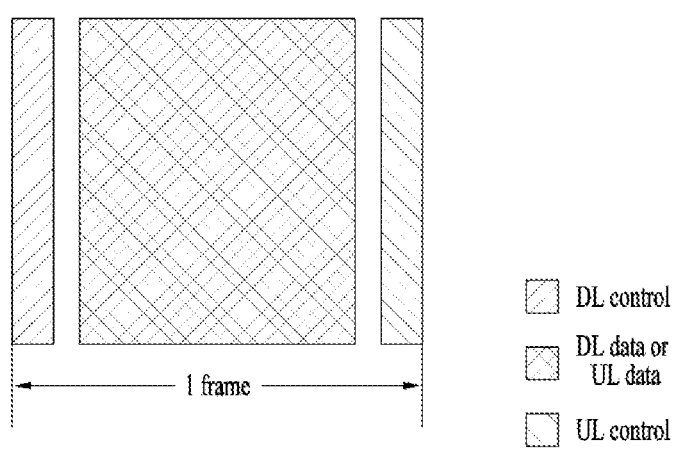

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Control Information Placement for Polar Code

Polar codes uses channel polarization, which was first proposed by Arikan in 2008. The polar codes have been studied as a candidate technology for replacing turbo codes and low-density parity-check (LDPC) codes. The channel polarization is a phenomenon where two channels with the same capacity are changed such that they have different capacities. In a channel combination of N=2, two channels with the same capacity of I(W) are polarized into two channels with different capacities. Input bits u1 and u2 are sent to x1=u1+u2 and x2=u2, respectively, and x1 and x2 are sent over the channels with the capacity of I(W). The channel capacities experienced by u1 and u2, I(W1) and I(W2) are polarized into I(W1)=I(W)^2 and I(W2)=2I(W)-I(W)^2. That is, u1 and u2 may be in a state where different channel capacities are used. The polar codes repeatedly use the above capacity polarization. In the polar codes, encoding is performed for a code length of N=2^n as shown in Equation 12.

$$d=uG_n \quad \text{[Equation 12]}$$

In Equation 12, Gn satisfies $G_N=(G_2)^{\otimes n}$, $\otimes$ denotes the Kronecker power of a matrix G2, and G2 is given as $$G_2 = \begin{bmatrix} 1 & 0 \\ 1 & 1 \end{bmatrix}.$$

When the channel polarization induced by a polarization matrix $G_N$ is used, information bits may be transmitted over K polarization channels with high reliability and frozen bits may be transmitted over the remaining (N-K) channels, thereby generating polar codes with a code rate of R=K/N. In general, the reliability decreases as the index decreases and vice versa. However, this relationship is not accurately established, and it may vary depending on how polar codes are generated.

It is defined that an index set corresponding to polarization channels with high reliability and an index set corresponding to polarization channels with low reliability are $\overline{Q}_T^N$ and $\overline{Q}_F^N$, respectively. Here, $|\overline{Q}_T^N|=K+n_{PC}$, $|\overline{Q}_F^N|=N-|\overline{Q}_T^N|$, and $n_{PC}$ denotes the number of parity check bits.

Designing polar codes for a block length of N is equal to defining information and frozen sets. In the 3GPP 5G NR specification, TS 38.212, the maximum length of a block Nmax is defined as 1024. An index indicating each element of a polar sequence is considered as i=0, 1, ..., $N_{max}-1$ for the maximum block length Nmax, and the index of each polarization channel is represented as $0 \le Q_i^{Nmax} \le N_{max}-1$. In this case, an NR polar sequence $Q_0^{Nmax-1}=\{Q_0^{Nmax}, Q_1^{Nmax}, \ldots, Q^{Nmax}_{N_{max}-1}\}$ may be configured according to the rule of Equation 13.

$$W(Q_0^{Nmax}) < W(Q_1^{Nmax}) < \ldots < W(Q^{Nmax}_{N_{max}-1}) \quad \text{[Equation 13]}$$

In Equation 13, $W(Q_i^{Nmax})$ denotes the reliability of a bit index $Q_i^{Nmax}$. A sequence with a random block length of N<=Nmax may be easily configured based on the NR polar sequence defined for the maximum block length Nmax. A partial sequence of a given sequence $Q_0^{Nmax-1}$, $Q_0^{N-1}=\{Q_u^N, Q_1^N, Q_2^N, \ldots, Q^N_{N-1}\}$ is considered. All elements of the partial sequence are less than Nmax and arranged according to the condition of Equation 14.

$$W(Q_0^N) < W(Q_1^N) < W(Q_2^N) < \ldots < W(Q^N_{N-1}) \quad \text{[Equation 14]}$$

Figure 15:
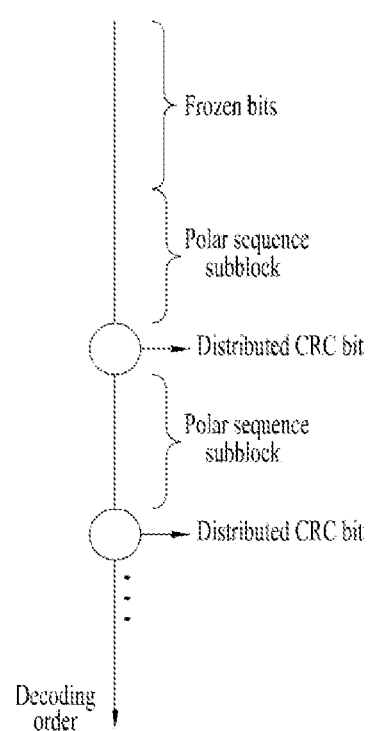
FIG. 15 is a diagram for explaining the decoding order of a polar code.

FIG. 15 is a diagram for explaining the decoding order of a polar code.

Referring to FIG. 15, the polar code is decoded in ascending order of indices. Frozen bits are allocated to the lowest bits and then information bits are allocated. Thereafter, the decoding starts. Before mapping the information bits, payload interleaving may be applied. In the case of a field that requires early decoding, the field may be placed such that it has a low index after the interleaving. To check whether each polar subblock is decoded, a CRC bit may be inserted into the middle of the polar subblock. A UE places the information bits after the frozen bits by interleaving the information bits. In this case, another UE decodes a specific field first and then determines whether additional decoding is required. Hereinafter, a description will be given of a method of placing control information based on the principles of the polar code.

In V2X communication or UE-to-UE communication (e.g., sidelink communication or D2D communication), a UE may autonomously select radio resources and use the radio resources for transmission. In this case, to prevent radio resources used by a specific UE from acting as interference to other UEs, the UE may perform monitoring or sensing of the radio resources for a predetermined time before selecting the radio resources. For example, the UE may monitor the radio resources for X ms. If the radio resources are not used by other UEs or has less interference, the UE may select some or all of the radio resources as a transmission resource. For example, the sensing operation in sidelink mode 4 defined in 3GPP TS 36.213 may be used. Specifically, the UE decodes a control signal (PSCCH) first and then measures the reference signal received power (RSRP) of a data signal (PSSCH) at the location of the data signal (PSSCH) indicated by the control signal. If the RSRP is more than or equal to a predetermined threshold, the UE may exclude a corresponding resource from available resources. The UE may measure the sidelink received signal strength indicators (S-RSSIs) of the remaining resources for each subchannel and randomly select a transmission resource from among resources corresponding to the bottom X percent of S-RSSIs. For example, if the polar code is applied to the control signal of the UE, the UE may early decode a specific field in the control signal (PSCCH) and then determine whether to decode the rest of the control signal (PSCCH) or decode the data signal (PSSCH).

At least one of the fields described below may be arranged in the order of decoding with priority within a payload of a control signal (PSCCH) for early decoding. In other words, during encoding, information bits corresponding to a specific field among a plurality of fields included in a sidelink control signal are mapped to low bit indices compared to the remaining fields. In this case, since a receiving UE receives the sidelink control signal and decodes the received sidelink control signal in descending (or, ascending) order of the bit indices of the polar code, the receiving UE may early decode the specific field.

A time/frequency resource indication field may be preferentially allocated to (or placed at) bit indices of the polar code where the early decoding is possible. Specifically, the resource allocation field may be the most important field of a control signal (PSCCH) in sidelink or V2X communication. Accordingly, the UE may decode the resource indication field of the control signal first and then measure the RSRP of a data signal (PSSCH) indicated by the corresponding control signal. If the RSRP is less than a predetermined threshold, the UE may skip additional decoding of the control signal (PSCCH) and/or decoding of the data signal (PSSCH).

Alternatively, proximity service (ProSe) per-packet priority (PPPP) or a packet priority field may be preferentially allocated (or mapped) to bit indices of the polar code where the early decoding is possible. The UE may ignore resources used by a packet with a lower priority than a message that the UE needs to transmit during the sensing operation and then perform the sensing/resource selection operation. If the early decoding is performed thereon in addition to the above-described time/frequency resource, the corresponding resources may be regarded as resources that are not excluded in the sensing, thereby achieving rapid sensing/resource selection operation.

Alternatively, a field containing information about whether a hybrid automatic repeat and request acknowledgement (HARQ ACK) is required may be preferentially allocated (or mapped) to bit indices of the polar code where the early decoding is possible. For example, when a specific packet is an important message that requires the HARQ ACK, the UE may use its limited UE capability first in decoding a signal related to the specific packet. Although the information about whether the HARQ ACK is required may be explicitly included in a control signal, the information may be provided in association with PPPP. For example, when a packet has a high priority, it may be indicated that the HARQ ACK is definitely required. When a packet has high importance or high reliability requirements, the priority field for the packet may indicate that the packet has a high priority. If the information about whether the HARQ ACK is required is included in the control signal and the early decoding is possible, the field containing the above information may be placed in a part of the polar code where the early decoding is possible.

Alternatively, a field related to unicast/multicast/broadcast types may be preferentially allocated (or mapped) to bit indices of the polar code where the early decoding is possible. If the decoding capability of the UE is limited, the UE may need to use its available decoding capability first in decoding an important message. When a unicast, a multicast, and a broadcast coexist, the field related to the unicast/multicast/broadcast types may be placed in a region where the early decoding is possible such that the UE first decodes the multicast or broadcast. In particular, when the total length of control information bits varies depending on the unicast/multicast/broadcast types, an indicator indicating the total length of control information bits may be placed in the region where the early decoding is possible.

Alternatively, a field related to scheduling mode information may be preferentially allocated to (or placed at) bit indices of the polar code where the early decoding is possible. The UE may determine whether to perform additional decoding by distinguishing between whether an eNB indicates a transmission resource or the UE autonomously selects the transmission resource. If the UE needs to decode a signal indicated by the eNB first, a network may signal to the UE an instruction that the UE needs to prioritize decoding in a mode scheduled by the eNB through a physical layer or higher layer signal. To this end, the UE may transmit the scheduling mode information by including it in the control signal. Since the capability of the UE is limited as described above, the scheduling mode information may be placed in the region where the early decoding is possible.

Alternatively, a field related to information about whether retransmission is required, information about the number of times that transmission (or retransmission) is performed, or information about a redundancy version (RV) may be preferentially allocated to (or placed at) bit indices of the polar code where the early decoding is possible. When the UE retransmits a specific packet multiple times, if the number of times that the retransmission is performed is more than or equal to a predetermined value, the UE may avoid additional decoding of the control signal or decoding of the data signal. To this end, some or all of the information about whether retransmission is required, information about the number of times that transmission (or retransmission) is performed, or RV information may be included in the control signal, and the information may be placed in the region where the early decoding is possible.

Alternatively, a field related to resource reservation information or time/frequency information about particular reserved resources may be placed in a part of the polar code which is decoded last. That is, the field related to the resource reservation information or time/frequency information about particular reserved resources may be placed at bit indices of the polar code where late decoding is applied rather than the early decoding. Since the field is not scheduling information for the current data signal, there is no problem if it is decoded last in the control signal.

From the perspective of the sensing operation, the field related to the resource reservation information or time/frequency information about particular reserved resources may be important in sensing next scheduling information. In this case, the field related to the resource reservation information or time/frequency information about particular reserved resources may be preferentially allocated to (or placed at) bit indices of the polar code where the early decoding is possible. If next scheduling information indicated by a certain UE immediately before a sensing window indicates a specific resource within a selectable resource window, the reservation information may be significantly important for a UE performing the sensing operation. In this context, the resource reservation information and/or the time/frequency resource information about reserved resources may be placed in the early decoding region.

When the polar code is used for sidelink, the polar code may be applied to a physical sidelink broadcast channel (PSBCH). In this case, specific information may be preferentially allocated to (or placed at) bit indices of the polar code where the early decoding is possible. According to current Rel.14 V2X, the PSBCH carries information about a direct frame number (DFN), a TDD configuration, a coverage indicator, and reserved bits. In NR, information about a DFN or a synchronization reference type (for example, whether a sidelink synchronization signal (SLSS) is transmitted by considering an eNB as synchronization reference, whether a global navigation satellite system (GNSS) is used as the synchronization reference, and/or whether an SLSS of another UE is used as the synchronization reference) may be placed at the bit index where the early decoding is possible.

In sidelink, REs of the first/last symbol, a symbol used for automatic gain control (AGC) tuning, or a guard symbol (i.e., a symbol for Tx/Rx switching) may not be used for data decoding. Thus, a payload with high reliability may not be placed in the above-described first/last symbol, symbol used for AGC, or guard symbol. The REs placed at the aforementioned symbol locations may be allocated as frozen bits, or an interleaver may be configured such that no field is allocated to the corresponding REs. In other words, in the polar code, information about the frozen bits may be mapped such that the information is transmitted in the symbol used for AGC tuning or guard symbol among a plurality of OFDM symbols included in a time resource for transmitting a sidelink control signal.

The above-described fields may correspond to information that requires the early decoding, but if the UE has a sufficient capability, the fields may correspond to information with considerably high reliability. That is, the aforementioned information may be placed in a region with high reliability, instead of being placed in the region where the early decoding is possible. For example, information about scheduled time and frequency resources may be placed in a region with the highest reliability.

The placement order of important fields among the above-described fields may be predetermined or signaled by the network to the UE through a physical layer or higher layer signal. The network signals to the UE which fields are decoded first or which fields are more important depending on purposes so that the UE may follow the instruction from the network when configuring a control signal.

The present disclosure is not limited to D2D communication. That is, the disclosure may be applied to UL or DL communication, and in this case, the proposed methods may be used by an eNB, a relay node, etc. Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from an eNB to a UE or from a transmitting UE to a receiving UE through a predefined signal (e.g., a physical layer signal, a higher layer signal, etc.).

Figure 16:
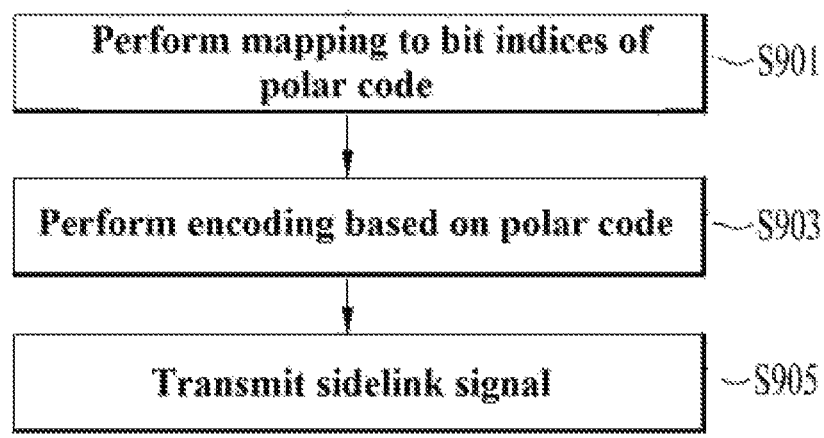
FIG. 16 is a flowchart for explaining a method of transmitting a sidelink signal based on a polar code according to an embodiment of the present disclosure.

FIG. 16 is a flowchart for explaining a method of transmitting a sidelink signal based on a polar code according to an embodiment of the present disclosure.

Referring to FIG. 16, a UE may encode information bits of input information based on a polar code. The input information includes information about a plurality of fields. The UE may map the information bits to bit indices of the polar code. When mapping the information bits to the bit indices, the UE may consider decoding order which depends on the bit index such that a specific field among the plurality of fields is decoded first.

For example, the information bits may include information bits corresponding to the plurality of fields related to the sidelink signal. A transmitting UE may match information bits corresponding to the specific field with lower bit indices than information bits corresponding to the remaining fields. Since polar-code-based decoding progresses in ascending order of bit indices, the UE may map the specific field among the plurality of fields to bit indices of the polar code where decoding is first performed. For example, when the input information includes first to third fields, bit indices may be sequentially matched in the following order: the first field, the second field, and the third field. Upon receiving the sidelink signal including the input information, a receiving UE may decode the first field before decoding the second and third fields according to the matched bit indices (or may early decode the first field).

For example, the specific field may be signaled by an eNB or determined in advance as a preconfigured field. That is, the specific field may be predetermined as a base field for the UE receiving the sidelink signal to skip or delay unnecessary decoding. Specifically, the specific field may be determined as a base field for determining whether additional decoding of the remaining fields is required or as a field for providing a criterion for determining which one of a plurality of sidelink signals the decoding capability of the UE focuses on. The following fields may be considered as the specific field.

When the sidelink signal is a control signal, the specific field may be a field indicating the resource region of a data signal related to the control signal. In this case, the field indicating the resource region may be information for determining whether the remaining fields needs to be additionally decoded. Specifically, the sidelink signal may be transmitted in the same subframe as the control and data signals. In this case, the control and data signals are transmitted together in one subframe, and the control signal may indicate the resource region of the corresponding data signal. Upon receiving the control signal, the receiving UE may first decode the field for the resource region indicated by the control signal and check whether the data signal is correctly transmitted in the indicated resource region. When the data signal is not correctly transmitted, the receiving UE may not decode the remaining fields of the control signal. Thus, to minimize unnecessary decoding of the control signal, the transmitting UE may map information bits corresponding to the field indicating the resource region of the data signal among fields included in the control signal to lower bit indices than information bits corresponding to the remaining fields.

Alternatively, the transmitting UE may map a field for PPPP among the plurality of fields to a lower bit index than the remaining fields. The reason for this is that the field for PPPP needs to be decoded first when a transmission resource is selected based on sensing. Specifically, when a resource for transmitting the sidelink signal is selected based on sensing, the receiving UE may determine a resource used by another UE with a lower packet priority than the priority of the receiving UE as an unoccupied resource. Thus, when the UE selects its resource based on sensing, the UE may need to determine whether the packet priority of the received sidelink signal is higher or lower than its packet priority. Considering this point, the transmitting UE may map the field for PPPP to a lower bit index than those of the remaining fields.

Alternatively, the specific field may be determined as a base field for determining the decoding priorities of the plurality of sidelink signals. Considering that there is a limitation on the decoding capability of the receiving UE, a specific sidelink signal may be configured to be decoded before other sidelink signals. In this case, the specific field may be determined as the field containing information for determining whether the sidelink signal is decoded first.

Specifically, the specific field may be determined as a field indicating whether the HARQ ACK is required for a specific packet. The specific field may be the base field for determining the decoding priorities of the plurality of sidelink signals. The transmitting UE may map the field indicating whether the HARQ ACK is required among the plurality of fields to a lower bit index than the remaining fields. Thus, when the receiving UE receives the plurality of sidelink signals, the receiving UE may easily recognize a sidelink signal that requires the HARQ ACK and then decode the sidelink signal before decoding other sidelink signals. Meanwhile, the HARQ ACK field may be associated with PPPP. Specifically, when PPPP is set to have a high priority, the HARQ ACK may be definitely required. In this case, the field for PPPP may indicate the necessity of the HARQ ACK. Accordingly, the transmitting UE may indirectly indicate the necessity of the HARQ ACK by determining the field for PPPP as the specific field.

Alternatively, the specific field may be determined as a field for sidelink signal transmission types. The specific field may be a basis for determining the decoding priorities of the plurality of sidelink signals based on the transmission types. Here, the transmission type may be any one of a unicast, multicast, and broadcast. In this case, the transmitting UE may map the field for the transmission types to a low bit index than the remaining fields.

Alternatively, the specific field may be determined as a field for scheduling modes. In this case, the specific field may be a basis for determining the decoding priorities of the plurality of sidelink signals based on the scheduling modes. The scheduling mode may refer to the transmission mode of the sidelink signal and be divided into a mode in which the sidelink signal is transmitted on a resource indicated by the eNB and a mode in which the sidelink signal is transmitted on a resource autonomously selected by the UE. For example, when decoding of the sidelink signal transmitted on the resource configured by the eNB is prioritized, the transmitting UE may map the field for the scheduling modes among the plurality of fields to a lower bit index than the remaining fields. In this case, the receiving UE may first decode the sidelink signal transmitted on the resource configured by the eNB among the plurality of sidelink signals based on the specific field where decoding is prioritized for the plurality of received sidelink signals.

Alternatively, when the sidelink signal is a PSBCH, the specific field may be determined as a field related to the reference synchronization signal of a UE transmitting the PSBCH. In this case, when transmitting the PSBCH, the transmitting UE may map the field indicating the type of the reference synchronization signal among a plurality of fields included in the PSBCH to a lower bit index than the remaining fields. The synchronization signal type may mean whether an SLSS, a GNSS, or an SLSS of another UE is used as synchronization reference. Upon receiving the field, the receiving UE may decode a PSBCH signal with a synchronization reference signal preferred by the UE.

Alternatively, when the sidelink signal is a PSBCH, obtaining a DFN from the PSBCH may be prioritized. In this case, the specific field may be determined as the DFN.

Alternatively, the specific field may be determined as a field related to resource reservation. If the transmitting UE selects a resource based on sensing, the transmitting UE needs to first consider the specific field. That is, a field for resource reservation information, which is to rapidly determine a transmission resource based on resource sensing, may be mapped to a lower bit index than other fields. Here, the resource reservation information may indicate that a specific packet is repeatedly transmitted with a predetermined interval and which resource is used therefor.

The UE may perform polar-code-based encoding based on the mapping relationship between the bit indices and the information bits (S903).

Thereafter, the UE may map or allocate modulation symbols corresponding to the encoded information bits to REs and then transmit the sidelink signal in the mapped or allocated REs. The sidelink signal may be transmitted on a predetermined time resource, and the time resource may include a plurality of OFDM symbols. For example, a time unit for transmitting the sidelink signal may be one subframe, at least one slot, or at least one OFDM symbol (S905).

With continued reference to FIG. 16, the UE may encode the information bits of the input information based on the polar code. The UE may map frozen bits with predetermined bit values to the remaining bit indices where no information bits are mapped by considering the size of the bit indices of the polar code. In this case, the frozen bits are mapped to the bit indices of the polar code having the lowest reliability. Modulation symbols related to the frozen bits may be first allocated to a specific OFDM symbol among the plurality of OFDM symbols in which the sidelink signal is transmitted. The specific symbol may be a symbol for AGC tuning or a guard symbol for Tx/Rx switching. That is, the UE may first allocate the modulation symbols corresponding to the frozen bits to prevent the modulation symbols corresponding to the input information from being allocated to OFDM symbol(s) which are not suitable for decoding.

To perform the polar-code-based encoding, the UE may map the information bits and the frozen bits to the bit indices of the polar code. The size of the frozen bits may be determined based on the size of the information bits and the size of the polar code. Information about the bit values and bit indices of the frozen bits may be shared by the transmitting and receiving UEs (S901).

When the size of the polar code is N and the number of the information bits of the input information is k (where k<N), the information bits may be one-to-one mapped to K bit indices of the polar code and the frozen bits may be mapped to the remaining (N-k) bit indices.

In this case, the UE may perform the polar-code-based encoding based on the mapping relationship between the bit indices and the information and/or frozen bits.

The UE may map or allocate modulation symbols corresponding to the encoded information and/or frozen bits to REs and transmit the sidelink signal in the mapped or allocated REs. The sidelink signal may be transmitted on a predetermined time resource, and the time resource may include a plurality of OFDM symbols. For example, a time unit for transmitting the sidelink signal may be one sub-frame, at least one slot, or at least one OFDM symbol.

The UE may map (or allocate) the modulation symbols (or information) corresponding to the information and frozen bits encoded based on the polar code. In this case, the UE may first map the modulation symbols corresponding to the frozen bits to REs in a specific OFDM symbol. The specific OFDM symbol may not be suitable for data transmission since it is difficult to decode the specific OFDM symbol due to the characteristics of sidelink. Specifically, the specific OFDM symbol may be a symbol used for AGC tuning or a guard OFDM symbol used for Tx/RX switching in sidelink transmission.

For example, the specific OFDM symbol may be an OFDM symbol used for the AGC tuning. In sidelink signal transmission and reception, the average power of a sidelink signal between transmitting and receiving UEs may be measured from the average power of the OFDM symbol for the AGC tuning. Thus, since no average power is determined in the OFDM symbol for the AGC tuning, data decoding may be properly performed on the OFDM symbol for the AGC tuning. Considering this point, the frozen bits (or modulation symbols corresponding thereto) which do not need to be decoded may be mapped or allocated to at least one OFDM symbol used for the AGC tuning. In other words, by mapping the frozen bits, which are additionally input according to polar coding and do not need to be decoded, to the at least one OFDM symbol, it is possible to minimize the unnecessary use of resources and prevent the information bits from being mapped to the at least one OFDM symbol for the AGC tuning. The OFDM symbol for the AGC tuning may be at least one of the first and last OFDM symbols among the plurality of OFDM symbols included in the time unit for transmitting the sidelink signal.

For example, the specific OFDM symbol may be an OFDM symbol used as the guard OFDM symbol. In sidelink signal transmission and reception, a sidelink signal may be include guard OFDM symbols to switch between Tx/Rx modes or minimize interference between sidelink signals. The guard OFDM symbol may not be suitable for data decoding. By first mapping or allocating the frozen bits to the guard symbol, it is possible to prevent the information bits from being mapped to the guard OFDM symbol. The guard symbol may be at least one of the first and last OFDM symbols among the plurality of OFDM symbols included in the time unit for transmitting the sidelink signal.

When the specific field is a basis for determining the decoding priorities of the plurality of sidelink signals, a sidelink signal with a high priority may be decoded first, and decoding of the remaining sidelink signals may be delayed according to the specific field.

Figure 17:
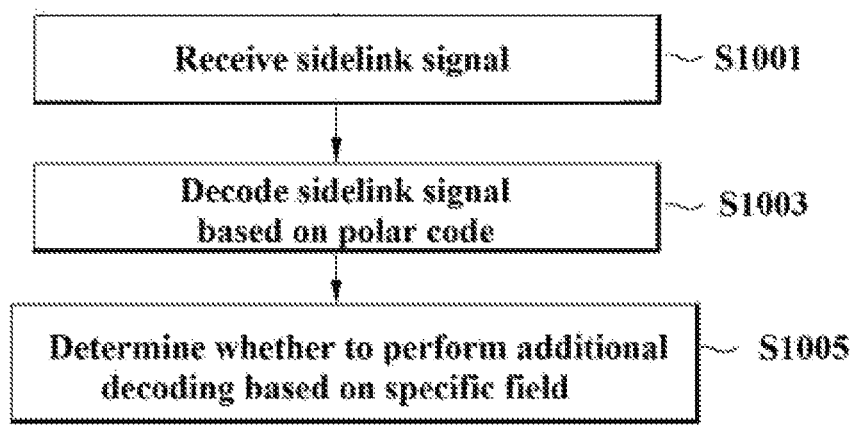
FIG. 17 is a flowchart for explaining a method of receiving a sidelink signal based on a polar code according to an embodiment of the present disclosure.

FIG. 17 is a flowchart for explaining a method of receiving a sidelink signal based on a polar code according to an embodiment of the present disclosure.

Referring to FIG. 17, a receiving UE may receive a sidelink signal, which is encoded based on a polar code with a size of N. The receiving UE may receive at least one sidelink signal (S1001).

When the receiving UE receives a plurality of sidelink signals (this includes a case in which the plurality of sidelink signals are received within a predetermined time), the receiving UE may determine whether to perform additional decoding of each of the plurality of sidelink signals or determine a sidelink signal to be decoded first among the plurality of sidelink signals, based on information in a specific field that is decoded first in each of the plurality of sidelink signals. Details will be described in the following.

Subsequently, the receiving UE may decode the sidelink signal using the N-size polar code. When using the polar code, the receiving UE may decode the sidelink signal in order of bit indices of the polar code (S1003).

Thereafter, the receiving UE may first decode the specific field among a plurality of fields included in the received sidelink signal. The receiving UE may determine whether to decode the remaining fields in the received sidelink signal based on the first decoded specific field. Alternatively, the receiving UE may determine the sidelink signal to be decoded first among the plurality of received sidelink signals based on the first decoded specific field. For example, the receiving UE may determine whether to additionally decode the sidelink signal based on the first decoded specific field. The first decoded specific field may include the following fields (S1005).

When the sidelink signal is a control signal, the first decoded specific field may be a field indicating the resource region of a related data signal. In this case, the receiving UE may determine whether to decode the remaining fields included in the sidelink signal based on the first decoded specific field. Specifically, if the strength of the data signal received in the indicated resource region is less than a predetermined threshold, the receiving UE may determine that the data signal is not correctly received. In this case, the receiving UE does not perform the additional decoding of the remaining fields. On the contrary, if the strength of the data signal received in the indicated resource region is more than or equal to the predetermined threshold, the receiving UE may perform the additional decoding of the remaining fields so that the receiving UE may obtain additional control information for the data signal.

Alternatively, a field for PPPP among the plurality of fields may be decoded earlier than other fields. When a resource for transmitting the sidelink signal is selected based on sensing, the receiving UE may determine whether to additionally decode the received sidelink signal by considering the first decoded PPPP field and the priority of a packet that the receiving UE transmits. For example, if the priority of the received sidelink signal is lower than the priority of the packet that the receiving UE transmits, the receiving UE may ignore resources occupied by the received sidelink signal in the sensing-based resource selection. In this case, since the receiving UE does not need to additionally obtain information about which resources are used for the received sidelink signal, the receiving UE may not decode the remaining fields included in the receiving sidelink signal.

Alternatively, upon receiving the plurality of sidelink signals, the receiving UE may determine the sidelink signal to be decoded first among the plurality of sidelink signals based on the first decoded specific field. When the receiving UE receives the plurality of sidelink signals, the receiving UE may require a large amount of time for decoding all of the plurality of sidelink signals due to a limitation on its decoding capability. In this case, the receiving UE may determine a specific important sidelink signal (or a sidelink signal that an eNB instructs to decode first) based on the specific field that is decoded first in each of the plurality of sidelink signals and then preferentially decode the determined sidelink signal. In other words, when receiving the plurality of sidelink signals, the receiving UE may determine the decoding priorities of the plurality of sidelink signals by decoding only the specific field in each sidelink signal and allocate its decoding capability preferentially to the specific sidelink signal based on the determined priorities.

Alternatively, among the plurality of fields, a field indicating the transmission type of a sidelink signal may be decoded first. In this case, the receiving UE may first decode a specific transmission type of sidelink signal among the plurality of received sidelink signals based on the transmission type field. For example, before decoding a unicast sidelink signal, the receiving UE may decode a multicast or broadcast sidelink signal, which includes important information, among the plurality of sidelink signals Alternatively, among the plurality of fields, the field indicating the sidelink signal transmission type may be decoded first. In this case, the receiving UE may determine a sidelink signal with a specific transmission type among multiple transmission types as a sidelink signal to be decoded first among the plurality of received sidelink signals. For example, when the eNB instructs to decode a sidelink signal transmitted on resources allocated by the eNB first, the receiving UE may select the sidelink signal transmitted on the resources allocated by the eNB from among the plurality of sidelink signals based on the specific field decoded first in each of the plurality of sidelink signals and then attempt to decode the selected sidelink signal first.

Alternatively, a field for scheduling modes among the plurality of fields may be decoded first. In this case, the receiving UE may first decode a sidelink signal transmitted in a specific scheduling mode among the plurality of sidelink signals. For example, when the eNB instructs to decode a sidelink signal transmitted on resources allocated by the eNB first, the receiving UE may first decode the sidelink signal transmitted on the resources allocated by the eNB among the plurality of sidelink signals based on scheduling mode information decoded first in each of the plurality of sidelink signals.

Alternatively, a field related to resource reservation in a received sidelink signal may be decoded first. When a resource for transmitting the sidelink signal is selected based on sensing, the receiving UE may need to exclude resources reserved by other UEs from resources that the receiving UE is supposed to use. Considering this point, since a UE selecting resources based on sensing may need to decode information about resources reserved by other UEs, the field related to the resource reservation among the plurality of fields may be determined to be decoded first.

Alternatively, when the sidelink signal is a PSBCH, the specific field may be determined as a field related to the reference synchronization signal of a UE transmitting the PSBCH. Specifically, the receiving UE may decode a PSBCH for a specific synchronization signal first based on the type of the synchronization signal, which is decoded first in the PSBCH. Alternatively, when the sidelink signal is a PSBCH, obtaining a DFN from the PSBCH may be prioritized. In this case, the specific field may be determined as the DFN.

Information about a field determined as the specific field may be configured in advance by an eNB, or the specific field may be configured by the eNB depending on the congestion level of sidelink communication resources. For example, when the transmission and reception state of a sidelink signal is congested, the eNB may set the specific field among the plurality of fields to a field for selecting a specific sidelink signal. Alternatively, when the transmission and reception state of a sidelink signal is congested, the eNB may determine the field related to the resource reservation as the specific field such that the sensing-based resource selection is rapidly performed.

For example, as described above with reference to FIG. 16, the sidelink signal may include the K information bits encoded by the N-size polar code (where N is an integer) and the (N-K) frozen bits. The receiving UE may receive information about the bit indices and bit values of the (N-k) frozen bits from the transmitting UE together with or before the sidelink signal. The receiving UE may not decode the frozen bits. That is, based on the information about the frozen bits, the receiving UE may not decode the frozen bits but decode the K information bits.

According to an embodiment of the present disclosure, the information about the frozen bits may be mapped or allocated to a predetermined specific symbol among a plurality of OFDM symbols included in a time resource on which the sidelink signal is transmitted and received therein. As described above with reference to FIG. 16, the specific OFDM symbol may be determined as at least one of the following OFDM symbols: the OFDM symbol used for AGC tuning and the OFDM symbol used for Rx/Tx switching in sidelink transmission.

Figure 18:
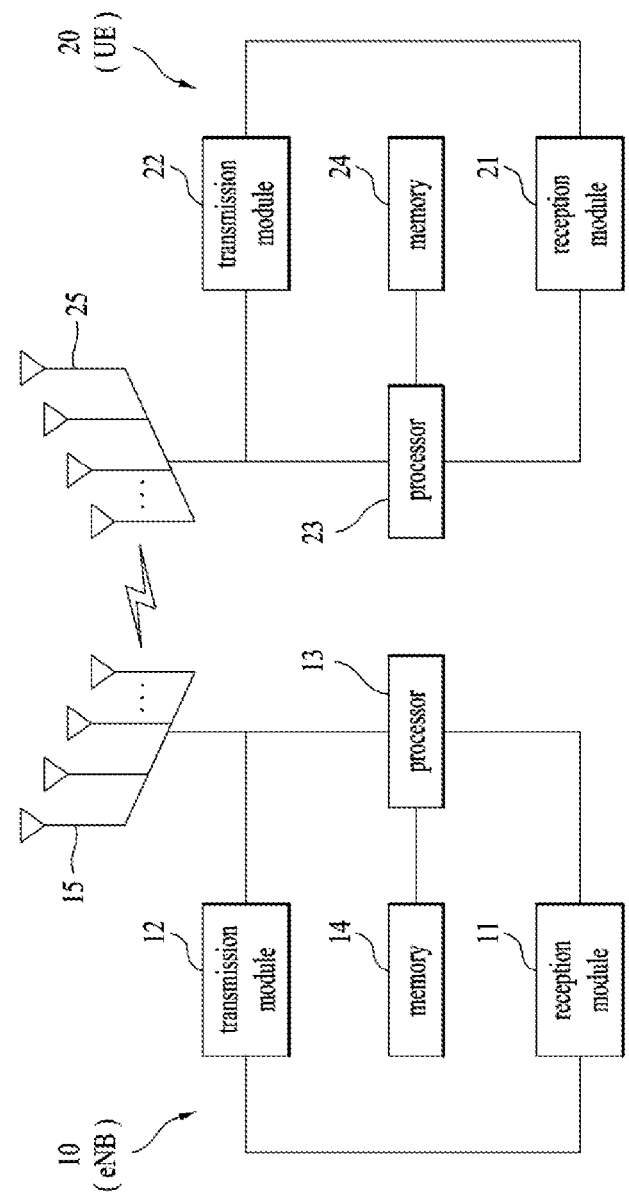
FIG. 18 is a diagram schematically illustrating a user equipment (UE) and an evolved node B (eNB) for performing sidelink communication according to the present disclosure.

FIG. 18 is a diagram schematically illustrating a UE and an eNB for performing sidelink communication according to the present disclosure.

Referring to FIG. 18, the UE 20 according to the present disclosure may include a receiver (reception module) 21, a transmitter (transmission module) 22, a processor 23, a memory 24, and a plurality of antennas 25. The plurality of antennas 25 mean that the UE 20 supports MIMO transmission and reception. The receiver 21 may be configured to receive various signals, data, and information from the eNB in DL. The transmitter 22 may be configured to transmit various signals, data, and information to the eNB in UL. The processor 23 may be configured to control the overall operation of the UE 20.

The processor 23 of the UE 20 according to an embodiment of the present disclosure may be configured to process the operations required in the aforementioned embodiments.

Specifically, the processor 23 may map information bits of input information including information about a plurality of field, which are transferred from the memory 24, and frozen bits with predetermined bit values to the bit indices of the polar code. The processor 23 may encode the mapped information bits based on the polar code. The processor 23 may generate a sidelink signal including the encoded information bits and transmit the generated sidelink signal through the transmitter 22. The processor 23 may map information bits corresponding to a specific field among the plurality of fields to bit indices lower than those to which information bits corresponding to the remaining fields are mapped.

Alternatively, the processor 23 may map the information bits of the input bit transferred from the memory 24 and the frozen bits with the predetermined bit values to the bit indices of the polar code. The processor 23 may encode the mapped information and frozen bits based on the polar code. The processor 23 may generate a sidelink signal including the encoded information and frozen bits and transmit the generated sidelink signal through the transmitter 22. The processor 23 may allocate the encoded frozen bits first to a specific OFDM symbol among a plurality of OFDM symbols included in a time unit in which the sidelink signal is transmitted.

The processor 23 may determine a symbol used for AGC tuning as the specific OFDM symbol. Alternatively, the processor 23 may determine the first OFDM symbol among the plurality of OFDM symbols as the symbol used for the AGC tuning. Alternatively, the processor 23 may determine a guard symbol for switching between transmission and reception modes as the specific OFDM symbol. In particular, the guard symbol may be the last OFDM symbol among the plurality of OFDM symbols.

The processor 23 may determine a field indicating a resource region for transmitting a sidelink data signal or a field about whether retransmission is performed as the specific field. The specific field may be a basis for determining whether the remaining fields are decoded. Alternatively, the processor 23 may determine a field indicating the transmission type of a control signal or a field for a sidelink transmission mode as the specific field.

The specific field may be a basis for determining a sidelink signal to be decoded first among sidelink signals. The processor 23 may determine a field related to PPPP as the specific field. Alternatively, the processor 23 may determine a field related to a HARQ ACK as the specific field. Alternatively, the processor 23 may determine the field for the sidelink transmission mode as the specific field.

Alternatively, when the sidelink signal is a PSBCH signal, the processor 23 may determine a field related to information about a reference synchronization signal as the specific field.

Further, the processor 23 of the UE 20 may be configured to perform a function of processing information received by the UE 20 or information to be transmitted by the UE 20 to the outside. The memory 24 may be configured to store the processed information for a predetermined time period, and the memory 24 may be replaced with a component such as a buffer (not shown in the drawing).

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

What is claimed is:

1. A method of transmitting, by a user equipment (UE), sidelink control information in a wireless communication system supporting sidelink, the method comprising:
    encoding the sidelink control information including a plurality of fields based on a polar code,
    wherein at least one field among the plurality of fields includes information on a position of a radio resource for a data channel; and
    transmitting the encoded sidelink control information,
    wherein the sidelink control information is encoded by applying a distributed cyclic redundancy check (CRC),
    wherein a priority field including a first value related to a ProSe per packet priority (PPPP) among the plurality of fields is mapped to indices of the polar code in which CRC check can be performed preferentially over other fields, and
    wherein the radio resource is selected based on the first value and a second value related to the PPPP included in sidelink control information of other UE.

2. The method of claim 1, wherein the plurality of fields further include a cast type field including information on a cast type of a signal.

3. The method of claim 1, wherein the plurality of fields further include a HARQ (hybrid automatic repeat request) field for whether transmission HARQ ACK (Acknowledgement) is required.

4. The method of claim 1, wherein the plurality of fields further include a field indicating a transmission type of a control signal or a field for a sidelink transmission mode.

5. The method of claim 1, wherein the plurality of fields further include a field for a sidelink transmission mode.

6. The method of claim 1, wherein information bits of the sidelink control information are mapped to the bit index of the polarity code,
wherein frozen bits with predetermined bit values are additionally mapped to bit indices of the polar code,
wherein the mapped frozen bits are encoded together with the mapped information bits and transmitted in a sidelink signal, and
wherein the encoded frozen bits are allocated first to a specific orthogonal frequency-division multiplexing (OFDM) symbol among a plurality of OFDM symbols included in a time unit for transmitting the sidelink signal.

7. The method of claim 6, wherein the specific OFDM symbol is an OFDM symbol used for automatic gain control (AGC) tuning.

8. The method of claim 7, wherein the symbol used for the AGC tuning is a first OFDM symbol among the plurality of OFDM symbols.

9. The method of claim 6, wherein the specific OFDM symbol is a guard OFDM symbol for switching between transmission and reception modes.

10. The method of claim 9, wherein the guard OFDM symbol is a last OFDM symbol among the plurality of OFDM symbols.

11. A device for transmitting a sidelink signal in a wireless communication system supporting sidelink, the device comprising:
a processor; and
a memory connected to the processor,
wherein the processor is configured to:
encode a sidelink control information including a plurality of fields based on a polar code; and
transmit the encoded sidelink control information,
wherein at least one field among the plurality of fields includes information on a position of a radio resource for a data channel,
wherein a priority field including a first value related to a ProSe per packet priority (PPPP) among the plurality of fields is mapped to indices of the polar code in which CRC check can be performed preferentially over other fields, and
wherein the radio resource is selected based on the first value and a second value related to the PPPP included in sidelink control information of other user equipment.

12. The method of claim 1, wherein the other fields include a field for a modulation and coding scheme (MCS) of a data channel.

* * * * *